(12) United States Patent
Nakakita et al.

(10) Patent No.: US 7,040,364 B2
(45) Date of Patent: May 9, 2006

(54) PNEUMATIC TIRE

(75) Inventors: Issei Nakakita, Hiratsuka (JP); Mitsuru Naito, Hiratsuka (JP); Takashi Fukutomi, Hiratsuka (JP)

(73) Assignees: The Yokohama Rubber Co., Ltd., (JP); Honda Giken Kogyo Kabushiki Kaisha, (JP)

( * ) Notice: Subject to any disclaimer, the term of this patent is extended or adjusted under 35 U.S.C. 154(b) by 225 days.

(21) Appl. No.: 10/468,473

(22) PCT Filed: Sep. 26, 2002

(86) PCT No.: PCT/JP02/09933

§ 371 (c)(1),
(2), (4) Date: Aug. 20, 2003

(87) PCT Pub. No.: WO03/033282

PCT Pub. Date: Apr. 24, 2003

(65) Prior Publication Data

US 2004/0074579 A1   Apr. 22, 2004

(30) Foreign Application Priority Data

Oct. 18, 2001   (JP) .............................. 2001-320501

(51) Int. Cl.
*B60C 19/12* (2006.01)

(52) U.S. Cl. .............................. 152/331.1; 152/339.1; 152/505; 152/510

(58) Field of Classification Search ........ 152/502–508, 152/331.1, 333.1, 339.1; 156/115
See application file for complete search history.

(56) References Cited

U.S. PATENT DOCUMENTS

| | | | | |
|---|---|---|---|---|
| 1,480,252 A | * | 1/1924 | Fetter | 152/507 |
| 3,129,743 A | * | 4/1964 | Nonnamaker | 152/341.1 |
| 3,903,947 A | * | 9/1975 | Emerson | 152/504 |
| 3,905,412 A | * | 9/1975 | Marocco | 152/340.1 |
| 4,206,796 A | * | 6/1980 | Chemizard | 152/505 |
| 4,945,965 A | * | 8/1990 | Kim | 152/511 |

FOREIGN PATENT DOCUMENTS

| | | |
|---|---|---|
| EP | 1 174 290 A1 | 1/2002 |
| JP | 2001-206007 A1 | 7/2001 |

OTHER PUBLICATIONS

International Search Report for PCT/JP02/09933 mailed on Jan. 21, 2003.

* cited by examiner

*Primary Examiner*—Geoffrey L. Knable
(74) *Attorney, Agent, or Firm*—Rader, Fishman & Grauer PLLC

(57) ABSTRACT

A pneumatic tire, comprising adhesive sealant applied onto the inner surface thereof, wherein an air barrier membrane is disposed on the inner surface of the tire at least at a tread part, a space part is formed between the air barrier membrane and the inner surface of the tire, and the adhesive sealant is stacked on the space part side surface of the air barrier membrane, whereby an increase in weight can be minimized and a workability in handling the tire can be increased.

10 Claims, 2 Drawing Sheets

PNEUMATIC TIRE

BACKGROUND OF THE INVENTION

1. Field of the Invention

The present invention relates to a pneumatic tire comprising a self-sealing function, to be more specific, a pneumatic tire provided with an adhesive sealant on the inner surface of the tire.

2. Detailed Description of the Prior Art

Conventionally, as measures against a flat tire when a car treads on a nail or the like during running, the following methods have been proposed, such as (1) use of a run-flat tire in which a rigid member is pre-inserted, (2) stopping up the hole by injecting a liquid repair agent into the tire from an air valve when getting a flat tire, (3) pre-lamination of an adhesive sealant on the inner surface of the tire at the time of manufacturing it.

However, the method (1) of using the run-flat tire has the problems that it is increased in weight due to the rigid material, and riding comfort is also damaged. The method (2) of injecting a repair liquid has a less problem about the increase in weight of the tire than the method (1). However, there is the other problem that the driver must come out of the car for performing the injection work when the tire gets punctured.

Compared with the methods (1), (2), the method (3) has advantages that the method has less problem of the increase in weight than the method (1), and the tire is self-sealed without performing the injection work by a human being at the time of getting a flat tire.

However, although the method (3) is more advantageous than the methods (1) and (2), the adhesive sealant needs to be disposed on the inner surface of the tire to a certain extent in thickness, therefore, the increase in weight cannot be avoided compared with a normal tire, and this results in increasing a fuel consumption of a car.

Moreover, since the adhesive sealant is exposed on the inner surface of the tire in the method (3), the workability is bad because the adhesive sealant sticks to the hands or the like when mounting or dismounting the tire on/from a vehicle.

SUMMARY OF THE INVENTION

The purpose of the present invention is to provide a pneumatic tire, comprising an adhesive sealant applied onto the inner surface thereof, whereby an increase in the weight can be minimized and workability in handling the tire can be increased.

The pneumatic tire of the present invention for achieving the above purpose is characterized in that an air barrier membrane is disposed on the inner surface of the tire at least at a tread part, a space part is formed between the air barrier membrane and the inner surface of the tire, and the adhesive sealant is stacked on the space side surface of the air barrier membrane.

As described above, by disposing the air barrier membrane stacked with the adhesive sealant on the inner surface of the tire with intervening the air part, when a nail or the like sticks in the tire, the air is exhausted to the inside of the tire from the space part at a position where the nail or the like is stuck. At the same time, the air barrier membrane at the stuck position adheres to the inner surface of the tire through the adhesive sealant. Thus, the air filled in the tire is prevented from leaking.

Thus, since the main sealing function is performed by the air barrier membrane and the adhesive sealant functions as an adhesive agent, the adhesive sealant to be used is reduced in quantity, and the tire can be prevented from being increased in weight.

Moreover, since the adhesive sealant is disposed inside of the air barrier membrane, the adhesive sealant is not exposed, and a worker does not directly touches the adhesive sealant when mounting and dismounting the tire.

DETAILED DESCRIPTION OF THE PREFERRED EMBODIMENT

The preferred embodiment of the present invention shown in the attached drawings will be explained in details below.

Figure 1:
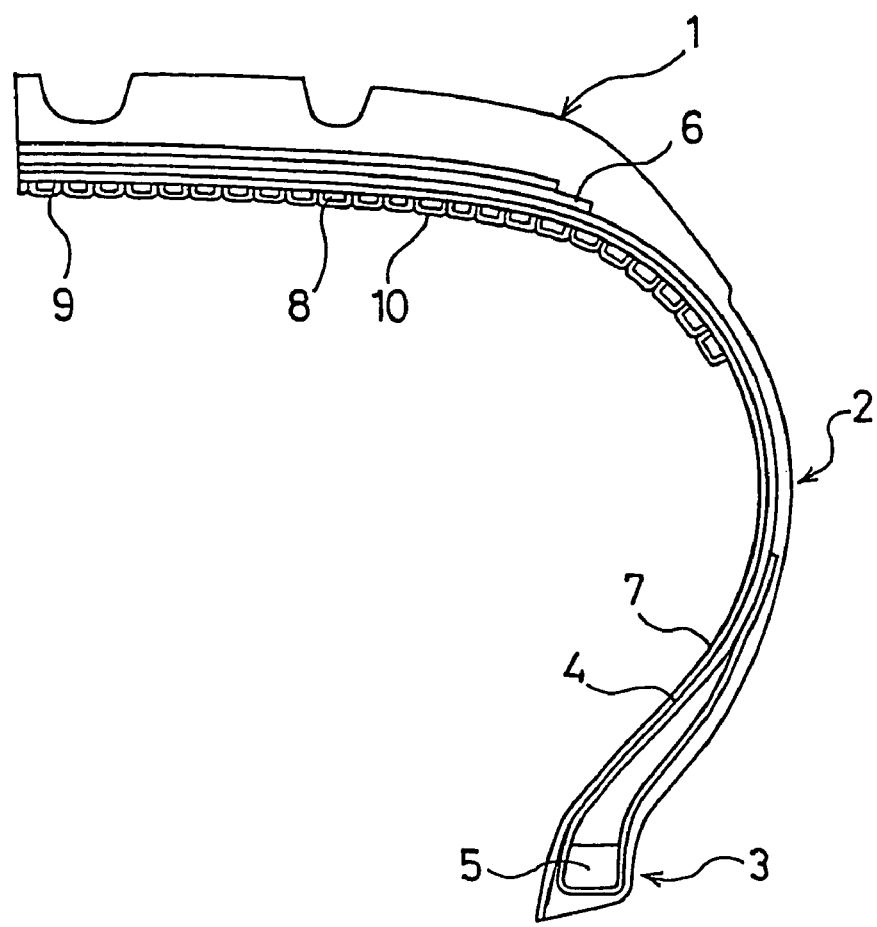
FIG. 1 is a meridian half sectional view showing an example of the pneumatic tire of the present invention.

FIG. 1 illustrates an example of the pneumatic tire in accordance with the present invention, and shows a meridian half sectional view. In FIG. 1, the reference 1 is a tread part; the reference 2 is a side wall part; and the reference 3 is a bead part. A carcass layer 4 is mounted between a pair of right and left bead parts 3, 3, and both of their end parts in the width direction of the tire are turned up around the respective bead cores from the inside to the outside of the tire. A belt layer 6 is mounted on the outer circumferential side of the carcass layer 4 in the tread part 1, and an inner liner 7 is arranged inside of the carcass layer 4.

In the position on the inner surface of the inner liner 7 corresponding to the tread part 1, an air barrier membrane 10 forming a plurality of independent air rooms is disposed along the inner surface of the tire, and space parts 8 are formed between the air barrier membrane 10 and the inner liner 7 on the inner surface of the tire. Moreover, an adhesive sealant 9 is stacked on the surfaces on the side of the space parts 8 of the air barrier membrane 10. Namely, the air barrier membrane 10 is lined with the adhesive sealant 9.

Figure 2:
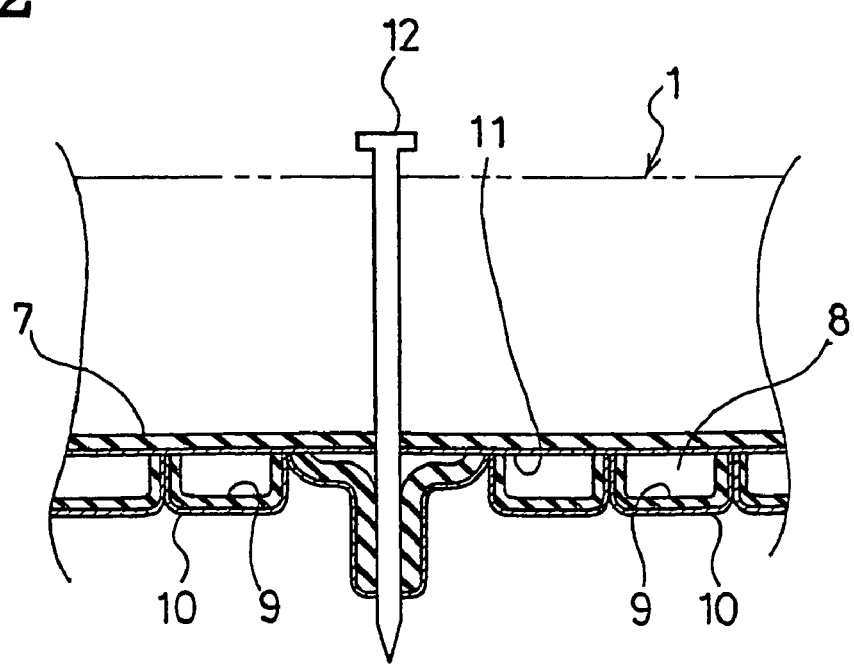
FIG. 2 is a cross-section view of the main part showing a state in which a nail stuck in the pneumatic tire presented at FIG. 1.

FIG. 2 shows an enlarged main part of the inner surface of the tire. As illustrated in FIG. 2, a pasting film 11 is pasted on the inner surface of the inner liner 7, and inside thereof, the air barrier membrane 10 forming a plurality of domed air rooms is pasted.

Here, the air barrier membrane 10 lined with the adhesive sealant 9 may be directly pasted on the surface of the inner liner 7 without placing the pasting film 11, however, the pasting operation can be carried out efficiently by disposing the air barrier membrane 10 lined with the adhesive sealant 9 on the pasting film 11 beforehand and then pasting them on the inner liner 7 as shown in FIG. 2.

Thus, since the air barrier membrane 10 lined with the adhesive sealant 9 is pasted on the inner surface of the tire through the space parts 8, when a nail 12 sticks in the tire to penetrate through it, the air barrier membrane 10 and the adhesive sealant 9 sticking around the nail 12 are increased in quantity (area), and the function to prevent the air from leaking can be better.

When the penetrating nail 12 comes off due to a centrifugal force at the time of running at a high speed, the air barrier membrane 10 sticks to the inner surface of the tire via the adhesive sealant 9, to function so as to close the hole of the nail 12 which came off, therefore, the air filled in the tire can be prevented from leaking.

Since the air barrier membrane mainly works for the above-mentioned puncture hole sealing function, the adhesive sealant to be used can be less in quantity compared with the case that the puncture hole is sealed only with the adhesive sealant, and as a result, the tire can be reduced in weight compared with a conventional run-flat pneumatic tire using the adhesive sealant.

Moreover, since the adhesive sealant is lined with the air barrier membrane, the adhesive sealant is not exposed. Therefore, mounting and dismounting work of the tire to/from the vehicle can be carried out smoothly without directly touching the adhesive sealant.

In the present invention, the adhesive sealant is not particularly limited as long as it has adhesiveness and a sealing property. For example, a material such as a sealant or the like obtained by adding 30 to 300 weight parts of polybutene to 100 weight parts of isobutylene-isoprene rubber (IIR) can be mentioned.

Moreover, the adhesive sealant is preferred to be 1 to 4 mm in thickness. When the adhesive sealant is thinner than 0.1 mm in thickness, the adhesive strength of the air barrier membrane to the inner surface of the tire becomes insufficient, and when it is thicker than 4 mm, the tire is made too heavy although the thickness does not affects on the sealing property.

The air barrier membrane is not particularly limited as long as it has impermeability to the air and has flexibility. For example, the air barrier membrane is formed from a membrane of polyethylene, polyethylene vinyl acetate, or the like.

Moreover, the air barrier membrane is preferred to be 0.01 to 0.5 mm in thickness, and when it is thinner than 0.1 mm, the membrane strength is too low, and when it is thicker than 0.5 mm, the membrane becomes difficult to deform flexibly and to adhere closely to the puncture hole.

Figure 3:
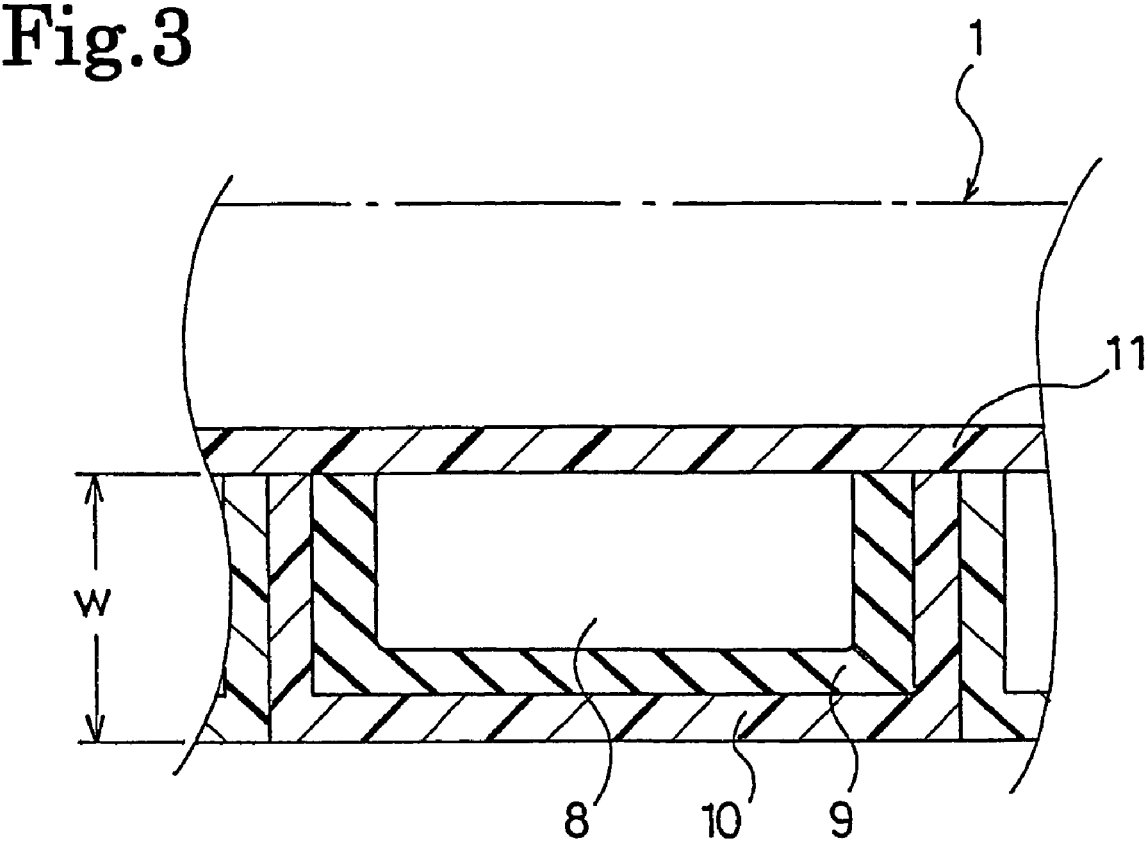
FIG. 3 is an enlarged cross-section view of the main part of the pneumatic tire presented at FIG. 1.

The total thickness W of the air barrier membrane, the adhesive sealant and the space part is preferred to be 5 to 20 mm (refer to FIG. 3). When the total thickness W is smaller than 5 mm, the space part is too small, and the air barrier membrane becomes insufficient in quantity to close the puncture hole. Moreover, when the total thickness is thicker than 20 mm, it becomes difficult to follow the inner surface to the tire, and the pasting operation also becomes difficult due to bulkiness.

While the present invention has been shown in several forms of the preferred embodiments in the above, it is to be understood that it is not so limited but is susceptible of various changes, substitutions, and replacements without departing from the sprit and scope of the present invention specified by the attached claims.

According to the present invention, an air barrier membrane is disposed on the inner surface of the tire at least in the tread part, and air space parts are formed between the air barrier membrane and the inner surface of the tire and also an adhesive sealant is applied onto the space part side surface of the air barrier membrane, therefore, the air can effectively be prevented from leaking when a nail or the like sticks in the tire.

Moreover, since the main sealing function is performed by the air barrier membrane and the adhesive sealant functions as an adhesive agent, the adhesive sealant to be used is reduced in quantity, and the tire can be prevented from being increased in weight.

In addition, since the adhesive sealant is disposed inside of the air barrier membrane, the adhesive sealant is not exposed, and a worker does not directly touch the adhesive sealant when mounting and dismounting the tire.

Therefore, it is possible to provide a pneumatic tire which is not only excellent in a self-sealing function, but is also light in weight and easy to handle.

What is claimed is:

1. A pneumatic tire comprising:
   air rooms disposed along the inner tire surface of the tire, each of said air rooms including an air barrier membrane, an adhesive sealant and a space part,
   wherein said adhesive sealant is between said air barrier membrane and said space part, and
   wherein said air barrier membrane, said adhesive sealant and said space part are in contact with said inner tire surface.

2. The pneumatic tire as claimed in claim 1, wherein said adhesive sealant is 0.1 to 4 mm in thickness.

3. The pneumatic tire as claimed in claim 1, wherein said air barrier membrane is 0.01 to 0.5 mm in thickness.

4. The pneumatic tire as claimed in any of the claim 1, 2 or 3, wherein the total thickness of said air barrier membrane, said adhesive sealant and said space part is 5 to 20 mm in thickness.

5. The pneumatic tire as claimed in claim 1, wherein said inner tire surface includes a pasting film and a tread part.

6. The pneumatic tire as claimed in claim 5, wherein said tread part is in contact with said pasting film.

7. The pneumatic tire as claimed in claim 5, wherein said air barrier membrane, said adhesive sealant and said space part are in contact with said pasting film.

8. The pneumatic tire as claimed in claim 1, wherein the air barrier membrane for one of said air rooms is in contact with the air barrier membrane for another of said air rooms.

9. The pneumatic tire as claimed in claim 1, wherein said adhesive is 30 to 300 weight parts of polybutene added to 100 weight parts of isobutylene-isoprene rubber.

10. The pneumatic tire as claimed in claim 1, wherein said air barrier membrane includes one of polyethylene and polyethylene vinyl acetate.

\* \* \* \* \*